Figure 1:
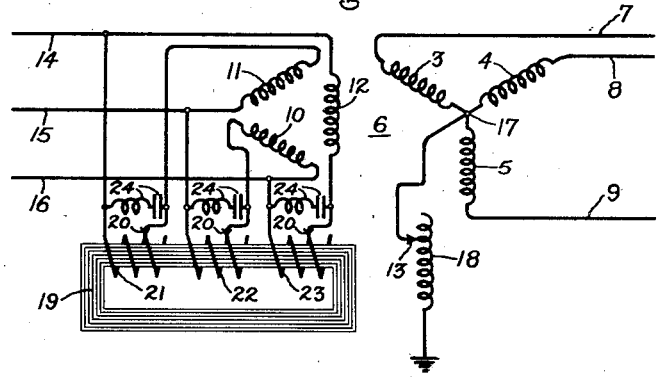

Nov. 14, 1939.    P. H. LIGHT    2,180,156

PROTECTION OF ALTERNATING CURRENT ELECTRIC SYSTEMS

Filed Dec. 23, 1938

Inventor:
Philip H. Light,
by Harry E. Dunham
His Attorney.

Patented Nov. 14, 1939

2,180,156

UNITED STATES PATENT OFFICE 2,180,156

PROTECTION OF ALTERNATING CURRENT ELECTRIC SYSTEMS

Philip H. Light, Schenectady, N. Y., assignor to General Electric Company, a corporation of New York Application December 23, 1938, Serial No. 247,457

8 Claims. (Cl. 172—237)

My invention relates to improvements in the protection of alternating current electric systems and more particularly to improvements in the protection of alternating current electric systems of the type in which a fault to ground on one phase conductor of the system substantially increases the voltage to ground of the other phase conductors of the system. More specifically, my invention relates to improvements in the protection of alternating current electric systems by arc suppression with ground fault neutralizers as fundamentally disclosed in United States Letters Patent 1,537,371, issued May 12, 1925, on an application filed by Waldemar Petersen. One object of my invention is to provide an improved earth fault arc suppression protective arrangement which is generally applicable to system neutral points which are not insulated from ground for the full line to neutral or star voltage of the system. Another object of my invention is to provide an improved earth fault arc suppression protective arrangement which is applicable to existing power transformers provided with delta connected windings without interfering with the regular uses of such windings. A further object of my invention is to provide an improved earth fault arc suppression arrangement which does not interfere with the normal flow of magnetizing current harmonics. A still further object of my invention is to avoid undesirable reactance loads under normal operating conditions and yet have the desired value of reactance instantly available in the event of a fault to ground on a phase conductor of the circuit. These and other objects of my invention will appear in more detail hereinafter.

Systems equipped with ground fault neutralizers have in the past required that the grounding device, such as a transformer for example, have its neutral point insulated to withstand the line to neutral or star voltage of the system. On these systems the ground fault neutralizer is connected between the neutral and ground and when a fault to ground occurs on a conductor the voltage at the neutral point immediately rises to approximately line to neutral voltage.

It has also been proposed to obtain the desired lagging current by a reactance device connected in a corner of a delta connected winding of a grounded transformer. This, however, is disadvantageous because it requires normal operation of the transformer at such a low flux density as to be inefficient and uneconomical.

In consequence of the foregoing, the application of ground fault neutralizers has been practically limited to systems which have the transformer neutral points insulated from ground for at least line to neutral voltage. There are in the United States of America, for example, many high voltage systems whose transformers have reduced insulation at the neutral. In consequence of this reduced insulation, it has not been possible to equip these systems with a ground fault neutralizer. In accordance with my invention, I propose to eliminate this limitation by connecting a part of the desired reactance of the neutralizer directly in the neutral and the balance of the desired reactance in circuit with a delta connected winding of the transformer in order to obtain, in the case of ground faults, the desired neutralizing current without raising the voltage at the neutral to a value in excess of that for which the neutral is insulated and also without the necessity for operating the transformer at flux densities below the usual practice. Moreover, further in accordance with my invention, I obtain the desired reactance to provide the necessary compensating lagging current without normally increasing the load on the transformer. Also in accordance with my invention I have the desired reactance available only for such time as is necessary and without interfering with any harmonics of the magnetizing current or introducing undesirable harmonics into the power circuit.

My invention will be better understood from the following description when considered in connection with the accompanying drawing, and its scope will be pointed out in the appended claims.

Figure 2:
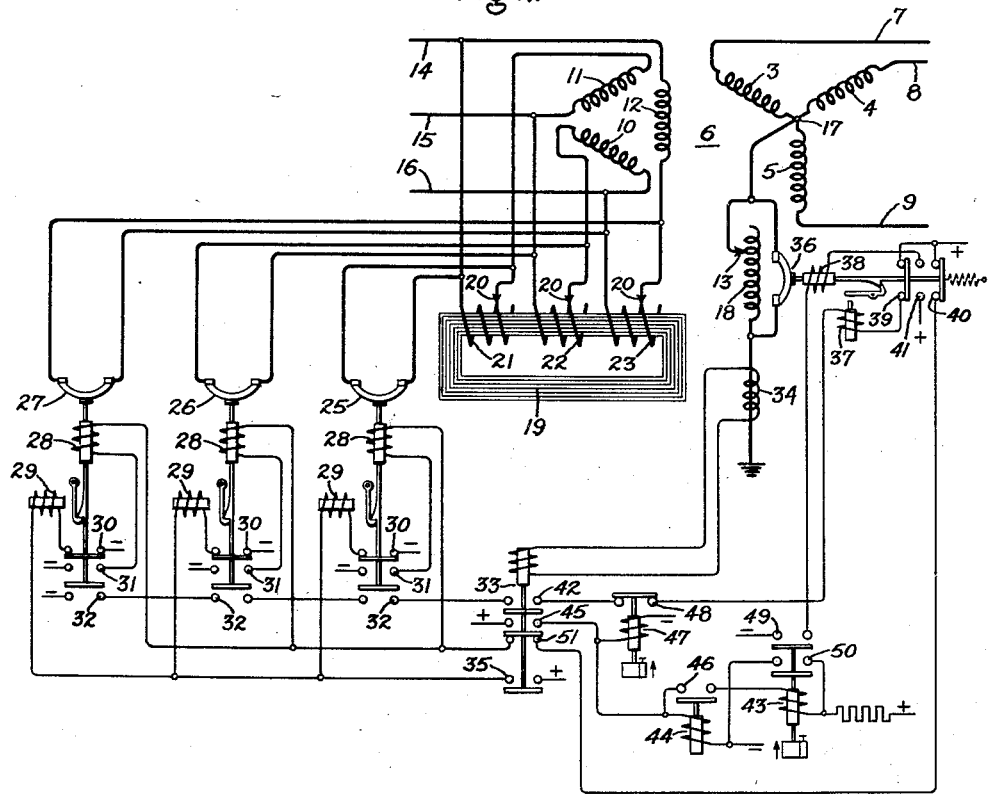

In the accompanying drawing, Fig. 1 illustrates diagrammatically one embodiment of my invention as applied to a three-phase circuit, and Fig. 2 illustrates diagrammatically another embodiment of my invention as applied to a three-phase circuit.

Referring now to Fig. 1 of the drawing, the windings 3, 4 and 5 of a power transformer 6 of any suitable type, examples of which are well known to the art, are star connected to the phase conductors 7, 8 and 9 of a three-phase circuit. The transformer 6 may also have other polyphase windings but so far as my invention is concerned I have illustrated only the delta connected windings 10, 11 and 12 to which may be connected the conductors 14, 15 and 16 of another polyphase circuit. Such circuit may be a load circuit or any piece of apparatus as is well known to the art. In accordance with my invention, the neutral point 17 of the transformer windings 3, 4 and 5 is connected to ground through suitable inductive means such as an inductive winding 18, the inductance of which is so proportioned that on the occurrence of a ground fault on any one of the phase conductors 7, 8 or 9 the voltage of the neutral point 17, with respect to ground, will not exceed the predetermined voltage for which the neutral point is insulated. In consequence of the fact that the neutral point 17 is assumed to be insulated for less than line to neutral voltage, the inductance of the winding 18 must differ from the amount taught by Dr. Petersen for securing the desired arc suppressing action. If we assume that the inductance of the winding 18 is too small, then lagging current in excess of the capacitance current to ground would flow and the arc would not be suppressed. In order to secure the desired amount of lagging current, I further introduce zero phase sequence inductive reactance in the system of such an amount that when combined with the inductive reactance of the winding 18 the resultant zero phase sequence lagging current is substantially equal to the zero phase sequence capacitance current on the occurrence of a ground on one of the phase conductors 7, 8 or 9.

In accordance with my invention, this may be accomplished by the use of an inductive reactance device 19 having three mutually inductively related windings 21, 22 and 23 which are connected in the corners of the delta connected windings 11, 12 and 13. These windings are so disposed with respect to the core and so proportioned and connected in the delta as to offer substantially no inductive reactance to positive and negative phase sequence currents. In other words, the inductance 19 does not constitute a load on the system, normally or during interphase faults not involving ground, to currents of power system frequency. However, on the occurrence of a ground fault on one of the phase conductors 7, 8 or 9, there is a resultant zero sequence current which circulates in the delta connected windings 10, 11 and 12 and the windings 21, 22 and 23. This current meets a zero phase sequence inductive reactance which, when added to the coexistent inductive reactance of the winding 18 results in a flow of lagging current between the neutral point 17 and ground through the winding 18 which is sufficient effectively to suppress the earth fault capacitance current.

Since, under normal operating conditions, the third harmonics of the magnetizing current tend to circulate in the delta connected windings 10, 11 and 12, such harmonics being in phase in the different windings, then introduction of the windings 21, 22 and 23 might in some cases present an undesirable impedance to these magnetizing currents. Accordingly, each of the windings 21, 22 and 23 may be bypassed by a suitably tuned circuit 24 whose impedance to the magnetizing current harmonics is substantially nothing. Thus, in accordance with my invention, the lagging current necessary to suppress the capacitance current of the ground fault is instantly available upon the occurrence of the ground fault and without any danger to the insulation of the transformer neutral and with substantially no load losses or interference with the normal transformer action under normal circuit conditions and in case of interphase faults not involving ground.

In order to avoid substantially all losses due to load current flow in the windings 21, 22 and 23 of the inductance device 19 under normal load conditions as well as any disturbances arising from flow of magnetizing harmonic currents, I may bypass these currents entirely from these windings by any suitable means, an example of which is shown in Fig. 2. Thus the windings 21, 22 and 23 may be arranged to be normally short-circuited by suitable switching means indicated as latched-closed circuit breakers 25, 26 and 27, respectively, which are normally closed. Each of these circuit breakers, as shown, is provided with a closing coil 28 and a trip coil 29 for carrying out further phases of my invention. Each circuit breaker may also include auxiliary switching means, such as contacts 30, which are closed when the circuit breaker is closed and opened when the circuit breaker is opened and contacts 31 and 32 which are opened when the circuit breaker is closed and vice versa.

In order to have the desired zero sequence inductive reactance available instantly upon the occurrence of a ground on one of the phase conductors 7, 8 or 9, I provide suitable means for quickly effecting the opening of the circuit breakers 25, 26 and 27 when the ground occurs. As illustrated, this is a ground fault responsive relay 33 whose winding may be connected in circuit to be energized in accordance with the flow of current in the ground lead of the inductance 18 through suitable means such as a current transformer 34. The relay 33, through its normally open contacts 35, controls the circuits of the trip coils 29 so that, upon response, each of the circuit breakers 25, 26 and 27 is opened whereby to restore the inductive effect of the inductance 19, this effect having been normally eliminated by the closed circuit breakers.

However, inasmuch as the opening of the circuit breakers 25, 26 and 27 requires some time, there would be a momentary period during which the voltage to ground of the neutral point 17 could well exceed its insulation breakdown value. In order to avoid this possibility, I so arrange that the inductance 18 cannot come into action until after the inductive effect of the reactance device 19 is available, that is, after the opening of the circuit breakers 25, 26 and 27. One way this may be done is normally to short-circuit the inductance 18 by suitable means such as a latched-closed circuit breaker 36. As shown this has a trip coil 37, a closing coil 38, auxiliary contacts 39 and 40, which are arranged to be closed when the circuit breaker is closed and opened when the circuit breaker is opened, and contacts 41, which are arranged to be opened when the circuit breaker is closed and vice versa. Then in order to insure the opening of the circuit breaker 36 on the occurrence of ground faults only after the inductance 19 is in action, I may connect the trip coil 37 in series with the contacts 32 of the circuit breakers 25, 26 and 27 and normally open contacts 42 on the ground fault relay 33.

Since it is desirable to eliminate the inductive effect of the device 19, particularly after the ground fault has been eliminated, I further provide means for reclosing the circuit breakers 25, 26 and 27 after they have been open a predetermined time but only after reclosing the circuit breaker 36. As shown, this means comprises a time delay closing relay 43 and a seal-in relay 44. The seal-in relay may be under the control of the circuit closing contacts 45 of the ground fault relay 33. As shown, the seal-in relay through its seal-in contacts 46 maintains its own circuit as well as energizing the circuit of the circuit closing relay 43 and also the circuit of a time delay circuit opening relay 47 whose contacts 48 are arranged in the circuit of the trip coil 37 of the circuit breaker 36 in order to prevent the tripping of this relay immediately after it is closed if the fault still exists. A predetermined time after the energization of the closing relay it operates through its contacts 49 to energize the closing coil 38 of the circuit breaker 36 whereby to effect the closing of this circuit breaker. At the same time the closing relay through its contacts 50 short-circuits itself and drops out but with sufficient time delay to insure the proper closing action of the circuit breaker 36. Upon the closing of the circuit breaker 36, the closing coils 28 of the circuit breakers 25, 26 and 27 will be energized through the circuit breaker auxiliary switch contacts 40 and through the contacts 51 of the ground fault relay 33 if such contacts are provided. If it is desired to have some inductive effect remain until the ground fault is cleared, the ground fault relay contacts 51 are provided. On the other hand, if these contacts are omitted, the inductive effect of the device 19 will be eliminated shortly after the closing of the circuit breaker 36. When the ground fault is removed, the seal-in relay 44 will be deenergized and drop out to effect the deenergization of the time delay pick up relay 47.

It will be obvious to those skilled in the art that the inductive devices 18 and 19 are preferably capable of adjustment so that the proper tuning to secure the desired arc suppressing effect may readily be obtained. For this purpose, they may be provided with suitable adjusting means, such as taps, which are indicated schematically by the sliding arrows 13 and 20. Obviously the inductance devices 18 should be set so that the maximum voltage rise at the associated neutral point does not exceed the inslulation to ground of that neutral point. Inasmuch as the inductive device 19 is adjustable independently of the inductive device 18, a considerable variation in the total inductance can be obtained on a given system in order to take care of the relative capacitances of the system under different system operating conditions without changing the setting of the inductance device 18 except when it is desired to reduce its inductance for a given neutral insulation. This feature of my invention thus provides considerable flexibility in the application of ground fault neutralizers to existing systems whose transformers have their neutral points insulated for less than line to ground voltage.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In a polyphase alternating current system of the type in which a fault to ground on one phase conductor of the system substantially increases the capacitance current to ground of the ungrounded conductors of the system, a transformer having windings connected in star to the phase conductors of the systems and windings connected in delta, said star connected windings being insulated adjacent their neutral point for a predetermined voltage which is materially less than the normal voltage to ground of a phase conductor of the system, inductive means connected in circuit with said delta connected windings to present inductance only to zero phase sequence currents of the system, another inductive means connected in circuit with said star connected windings, said two inductive means providing on the occurrence of a ground on a phase conductor of the system a zero phase sequence lagging current for effectively suppressing the capacitance current to ground at the grounded point, the inductive means in circuit with said star connected windings being so proportioned that on the occurrence of a ground on a phase conductor of the system the voltage to ground of the neutral point of said star connected windings does not exceed said predetermined voltage.

2. In a polyphase alternating current system of the type in which a fault to ground on one phase conductor of the system substantially increases the capacitance current to ground of the ungrounded conductors of the system, a transformer having windings connected in star to the phase conductors of the system and windings connected in delta, said star connected windings being insulated adjacent their neutral point for a predetermined voltage which is materially less than the normal voltage to ground of a phase conductor of the system, inductive means connected in circuit with said delta connected windings to present inductance only to zero phase sequence currents of the system, another inductive means connected in circuit with said star connected windings, said two inductive means providing on the occurrence of a ground on the phase conductors of the system a zero phase sequence lagging current for effectively suppressing the capacitance current to ground at the grounded point, the inductive means in circuit with said star connected windings being so proportioned that on the occurrence of a ground on a phase conductor of the system the voltage to ground of the neutral point of said star connected windings does not exceed said predetermined voltage, and means for effecting a substantially unimpeded flow of third harmonic currents in said delta connected windings.

3. In a polyphase alternating current system of the type in which a fault to ground on one phase conductor of the system substantially increases the capacitance current to ground of the ungrounded conductors of the system, a transformer having windings connected in star to the phase conductors of the system and windings connected in delta, said star connected windings being insulated adjacent their neutral point for a predetermined voltage which is materially less than the normal voltage to ground of a phase conductor of the system, inductive means connected in circuit with said delta connected windings to present inductance only to zero phase sequence currents of the system, another inductive means connected in circuit with said star connected windings, said two inductive means providing on the occurrence of a ground on a phase conductor of the system a zero phase sequence lagging current for effectively suppressing the capacitance current to ground at the grounded point, the inductive means in circuit with said star connected windings being so proportioned that on the occurrence of a ground on a phase conductor of the system the voltage to ground of the neutral point of said star connected windings does not exceed said predetermined voltage, and means for normally eliminating the inductive effects of both of said inductive means operative on the occurrence of a ground fault on the system to restore the inductive effects of both of said inductive means in a predetermined sequence.

4. In a polyphase alternating current system of the type in which a fault to ground on one phase conductor of the system substantially increases the capacitance current to ground of the ungrounded conductors of the system, a transformer having windings connected in star to the phase conductors of the system and windings connected in delta, said star connected windings being insulated adjacent their neutral point for a predetermined voltage which is materially less than the normal voltage to ground of a phase conductor of the system, inductive means connected in circuit with said delta connected windings to present inductance only to zero phase sequence currents of the system, another inductive means connected in circuit with said star connected windings, said two inductive means providing on the occurrence of a ground on a phase conductor of the system a zero phase sequence lagging current for effectively suppressing the capacitance current to ground at the grounded point, the inductance means in circuit with said star connected windings being so proportioned that on the occurrence of a ground on a phase conductor of the system the voltage to ground of the neutral point of said star connected windings does not exceed said predetermined voltage, and means for normally eliminating the inductive effects of both of said inductive means operative in response to the flow of current in the inductive means connected in circuit with said star connected windings to restore the inductive effects of both of said inductive means including means for again eliminating said inductive effects after a predetermined time.

5. In a polyphase alternating current system of the type in which a fault to ground on one phase conductor of the system substantially increases the capacitance current to ground of the ungrounded conductors of the system, a transformer having windings connected in star to the phase conductors of the system and windings connected in delta, said star connected windings being insulated adjacent their neutral point for a predetermined voltage which is materially less than the normal voltage to ground of a phase conductor of the system, three mutually inductively related windings respectively connected in the corners of the delta of said delta connected windings to present inductance to zero phase sequence currents of the fundamental frequency of the system, inductive means connected between the neutral point of said star connected windings and ground, said mutually inductively related windings and said inductive means providing on the occurrence of a ground on a phase conductor of the system a zero phase sequence lagging current for effectively suppressing the capacitance current to ground at the grounded point, the inductive means in circuit with said star connected windings being so proportioned that on the occurrence of a ground on a phase conductor of the system the voltage to ground of the neutral point of the star connected windings does not exceed said predetermined voltage.

6. In a polyphase alternating current system of the type in which a fault to ground on one phase conductor of the system substantially increases the capacitance current to ground of the ungrounded conductors of the system, a transformer having windings connected in star to the phase conductors of the system and windings connected in delta, said star connected windings being insulated adjacent their neutral point for a predetermined voltage which is materially less than the normal voltage to ground of a phase conductor of the system, three mutually inductively related windings respectively connected in the corners of the delta of said delta connected windings to present inductance to zero phase sequence currents of the fundamental frequency of the system, inductive means connected between the neutral point of said star connected windings and ground, said mutually inductively related windings and said inductive means providing on the occurrence of a ground on a phase conductor of the system a zero phase sequence lagging current for effectively suppressing the capacitance current to ground at the grounded point, the inductive means in circuit with said star connected windings being so proportioned that on the occurrence of a ground on a phase conductor of the system the voltage to ground of the neutral point of the star connected windings does not exceed said predetermined voltage, and means for effecting a substantially unimpeded flow of third harmonic currents in said mutually inductively related windings.

7. In a polyphase alternating current system of the type in which a fault to ground on one phase conductor of the system substantially increases the capacitance current to ground of the ungrounded conductors of the system, a transformer having windings connected in star to the phase conductors of the system and windings connected in delta, said star connected windings being insulated adjacent their neutral point for a predetermined voltage which is materially less than the normal voltage to ground of a phase conductor of the system, three mutually inductively related windings respectively connected in the corners of the delta of said delta connected windings to present inductance to zero phase sequence currents of the fundamental frequency of the system, inductive means connected between the neutral point of said star connected windings and gorund, said mutually inductively related windings and said inductive means providing on the occurrence of a ground on a phase conductor of the system a zero phase sequence lagging current for effectively suppressing the capacitance current to ground at the grounded point, the inductive means in circuit with said star connected windings being so proportioned that on the occurrence of a ground on a phase conductor of the system the voltage to ground of the neutral point of the star connected windings does not exceed said predetermined voltage, switching means for normally short-circuiting said mutually inductively related windings, and means operative in response to the flow of current in said inductive means for effecting the opening of said switching means.

8. In a polyphase alternating current system of the type in which a fault to ground on one phase conductor of the system substantially increases the capacitance current to ground of the ungrounded conductors of the system, a transformer having windings connected in star to the phase conductors of the system and windings connected in delta, said star connected windings being insulated adjacent their neutral point for a predetermined voltage which is materially less than the normal voltage to ground of a phase conductor of the system, three mutually inductively related windings respectively connected in the corners of the delta of said delta connected windings to present inductance to zero phase sequence currents of the fundamental frequency of the system, inductive means connected between the neutral point of said star connected windings and ground, said mutually inductively related windings and said inductive means providing on the occurrence of a ground on a phase conductor of the system a zero phase sequence lagging current for effectively suppressing the capacitance current to ground at the grounded point, the inductive means in circuit with said star connected windings being so proportioned that on the occurrence of a ground on a phase conductor of the system the voltage to ground of the neutral point of the star connected windings does not exceed said predetermined voltage, switching means for normally short-circuiting said mutually inductively related windings, means operative in response to the flow of current in said inductive means for effecting the opening of said switching means, and means for reclosing said switching means after they have been open for a predetermined time.

PHILIP H. LIGHT.